United States Patent [19]
Fischer

[11] Patent Number: 5,785,029
[45] Date of Patent: Jul. 28, 1998

[54] RECIPROCATING PISTON ENGINE, ESPECIALLY INTERNAL COMBUSTION ENGINE, WITH HYPCYCLOIDAL SHAFT DRIVE

[75] Inventor: Gert Fischer, Feldafing, Germany

[73] Assignee: Bayerische Motoren Werke Aktiengesellschaft, Munich, Germany

[21] Appl. No.: 894,210

[22] PCT Filed: Feb. 14, 1996

[86] PCT No.: PCT/EP96/00632

§ 371 Date: Aug. 14, 1997

§ 102(e) Date: Aug. 14, 1997

[87] PCT Pub. No.: WO96/25588

PCT Pub. Date: Aug. 22, 1996

[30] Foreign Application Priority Data

Feb. 14, 1995 [DE] Germany ............... 195 04 891.1

[51] Int. Cl.[6] .................................................. F02B 75/22
[52] U.S. Cl. .................................................. 123/197.3
[58] Field of Search ........................... 123/197.1, 197.4, 123/197.3

[56] References Cited

U.S. PATENT DOCUMENTS

| | | | |
|---|---|---|---|
| 2,271,766 | 2/1942 | Huebotter | 74/604 |
| 3,386,429 | 6/1968 | Trammell, Jr. | 123/197.1 |
| 4,498,372 | 2/1985 | Pareja | 92/187 |
| 4,727,794 | 3/1988 | Kmicikiewicz | 123/197.1 |
| 4,905,540 | 3/1990 | Hughes et al. | 123/197.3 |
| 5,560,327 | 10/1996 | Brackett | 123/197.1 |
| 5,673,666 | 10/1997 | Beardmore et al. | 123/197.3 |

FOREIGN PATENT DOCUMENTS

| | | |
|---|---|---|
| 0 545 333 | 6/1993 | European Pat. Off. . |
| 42 05 283 | 8/1993 | Germany . |
| 2 211 272 | 6/1989 | United Kingdom . |

Primary Examiner—David A. Okonsky
Attorney, Agent, or Firm—Evenson, McKeown, Edwards & Lenahan, P.L.L.C.

[57] ABSTRACT

To attain a kinematically advantageous buckling capacity in the connecting rod in a reciprocating piston engine, especially an internal combustion engine, with a hypocycloidal crank shaft drive that works together with a connecting rod which is connected at both ends to pistons in diametrically opposite cylinders and which is designed for buckling to compensate deviations in tolerances, the invention provides that the connecting rod is formed from rod segments arranged for angular movement about the axis of the bearing throughhole, the angular movements of the rod segments being elastically limited as a function of permissible tilting movements of the pistons, which are rigidly connected to the corresponding rod segments.

17 Claims, 3 Drawing Sheets

5,785,029

RECIPROCATING PISTON ENGINE, ESPECIALLY INTERNAL COMBUSTION ENGINE, WITH HYPCYCLOIDAL SHAFT DRIVE

BACKGROUND AND SUMMARY OF THE INVENTION

The invention relates to a reciprocating piston engine, especially an internal combustion engine as is known, for example from U.S. Pat. No. 2,271,766.

This document teaches a reciprocating engine with hypocycloid crank drive which comprises an eccentric rod connected at both ends with pistons in cylinders located diametrically opposed to one another. This eccentric rod consists of a master con-rod, mounted on a stroke eccentric of the hypocycloid, for one of the pistons and a shorter slave con-rod for the other piston, articulated to the bearing cover of the master con-rod. Both pistons are also connected with articulation with the respective connecting rods so that this known eccentric rod is bendable and therefore serves especially to reduce the stresses that result from the components of the crank drive that move because of variations in tolerance.

The particular disadvantage of this known arrangement is the difference in piston wear caused by the con-rods being of different lengths.

The goal of the invention is to design an eccentric rod with a kinematically more favorable bendability.

This goal is achieved according to the present invention by forming the eccentric rod of rod segments angularly movable around the axis of the bearing opening (for the stroke eccentric), with the angular movements of the rod sections being elastically limited as a function of the admissible tilting movements of the pistons permanently attached to the respective rod sections.

As a result of the central bending according to the invention of the eccentric rod in conjunction with a degree of bending that can be set as a function of the piston geometry, uniform and considerably reduced piston wear is achieved in an advantageous manner. In addition, the eccentric rod according to the invention provides a kinematically safe support for the hypocycloid crank drive as it passes through the central position with the piston in a TDC/BDC position by virtue of the fact that the angular movements of the rod sections of the centrally bendable eccentric rod are preferably limited as a function of elasticities that grow progressively more rigid.

Another advantage is the use of the bending eccentric rod according to the invention in a hypocycloid crank drive with Watt straight guidance. As is known, the center of the Watt linkage, which is coaxial to the axis of the bearing opening of the eccentric rod, instead of a long and ideal straight guideline, moves along a slightly loop-shaped guideline whose deviations from the ideal straight guideline are advantageously reduced by means of the bending eccentric rod as it operates.

The design of the invention comprises an eccentric rod composed of three parts with two eccentric rod segments each connected with a piston, whose end areas facing one another are disposed with guidance and a movable rotational angle in an annular central part that contains the bearing opening for the stroke eccentric. The eccentric rod sections can be fastened in advantageous fashion on the middle part, with the respective piston in each cylinder being mounted in simple fashion to the cylinder head by the eccentric rod section. Since this means that one double piston mounted on a one-piece piston rod can be prevented from pushing from one cylinder into the opposite cylinder, the engine block can be designed with structurally integrated bearing eyes for a crankshaft bearing, said eyes projecting in the direction of the eccentric rod according to the invention. In this way, the rigidity of the engine block is increased.

In addition, the eccentric rod sections according to the invention can comprise ribs that are spaced as far apart as possible to achieve high bending stiffness in view of the piston diameter, said ribs being connected integrally at one end with a relatively short piston and on the other end, on the bearing side, with a guide surface for the connecting arc that performs the bending movement. This design considerably simplifies the manufacture of the eccentric rod segments, which are made as castings, preferably from lightweight metal.

Finally, since the stroke eccentric that engages the bearing opening of the annular central part is a steel part, the central part is advantageously also made of steel to achieve optimum bearing play over the entire range of operating temperatures.

In particular, the bending inward or outward of the eccentric rod which is accomplished according to the invention under control and against elastic resistance permits an elasticity that is effective transversely to the direction of movement of the eccentric rod, permitting relatively large tolerances and slack in the crank drive itself as well as between the crank drive and the engine block. Advantageously, the manufacturing costs are reduced as a result, as is the frictional energy Preferably, an elasticity is chosen that becomes progressively more rigid with the degree of bending of the eccentric rod, with small lateral piston forces being achieved with an initially low elastic resistance during angular movements of the rod sections in the vicinity of half the piston travel, and the additional, highly progressively increasing elastic resistance advantageously causes an unambiguous change of a straight guidance element of the hypocycloid crank drive from one guiding side to the other in a piston TDC/BDC position of the eccentric rod. In addition, the progressively increasing resistance can be selected or set so that at a predetermined maximum resistance value, the effect of a stop results. An especially simple design of this elastic angle stop is achieved by means of bushings made of elastic material that are impacted by bolts that traverse them coaxially.

Other objects, advantages and novel features of the present invention will become apparent from the following detailed description of the invention when considered in conjunction with the accompanying drawings.

DETAILED DESCRIPTION OF THE DRAWINGS

Figure 1:
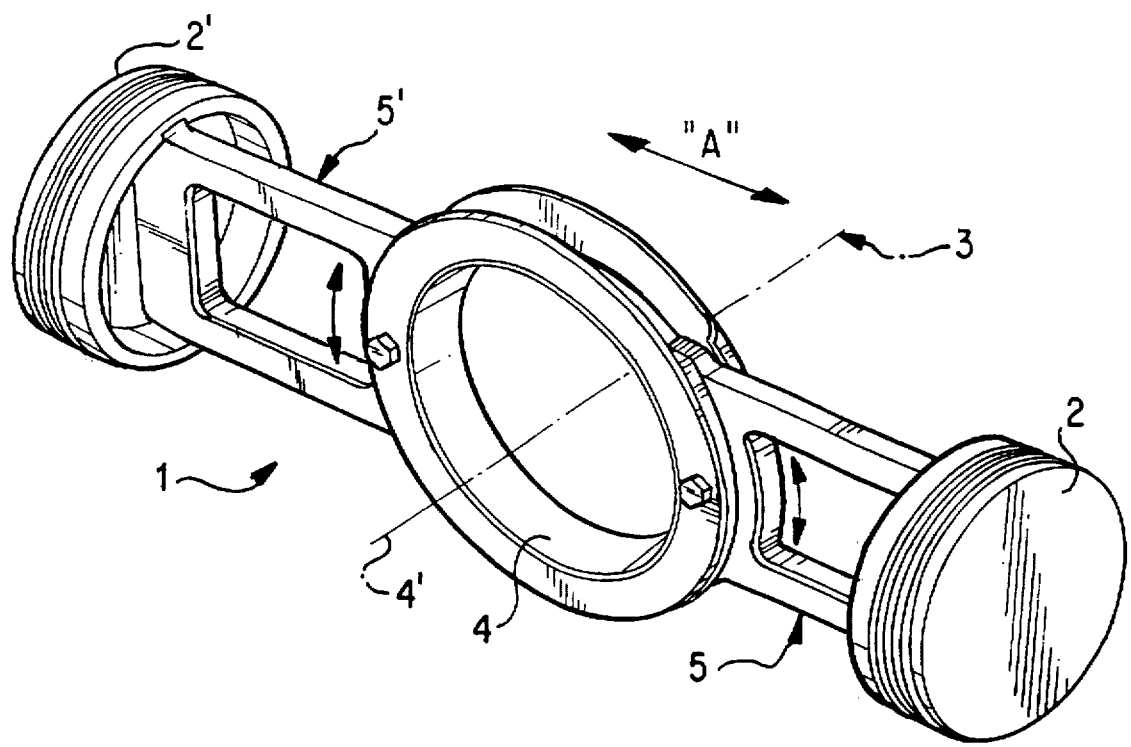
FIGS. 1 and 1A show an eccentric rod according to a preferred embodiment of the invention in a front and rear view.
Figure 1A:
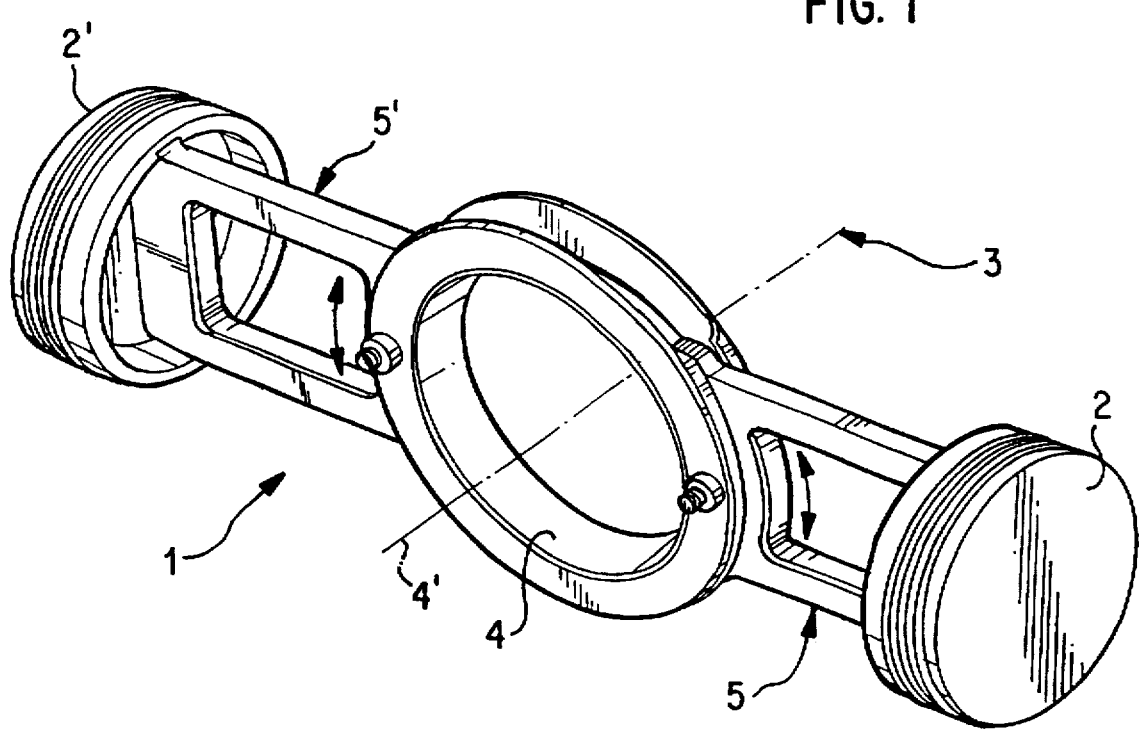

An eccentric rod 1 is provided at both ends with pistons 2, 2' for the diametrically opposed cylinders of a reciprocating engine that is not shown but is equipped with a hypocycloid crank drive. Eccentric rod 1 has a bearing opening 4 located parallel to the crankshaft rotational axis 3 for rotatably movable acceptance of a stroke eccentric (not shown) of the hypocycloid crank drive. To reduce in particular the stresses that result from variations in tolerance of the moving parts of the crank drive, eccentric rod 1 is made able to bend traversely with respect to the stroke direction indicated by arrow "A".

According to the invention, eccentric rod 1 is formed by four rod sections 5, 5' angularly movable around axis 4' of bearing opening 4 that is parallel to crankshaft rotational axis 3, with the angular movements of rod sections 5, 5' being performed for the central bending inward and outward of eccentric rod 1 as a function of admissible tilting movements of pistons 2, 2' permanently connected with respective rod sections 5, 5' by means of elastic arrangements.

Figure 2:
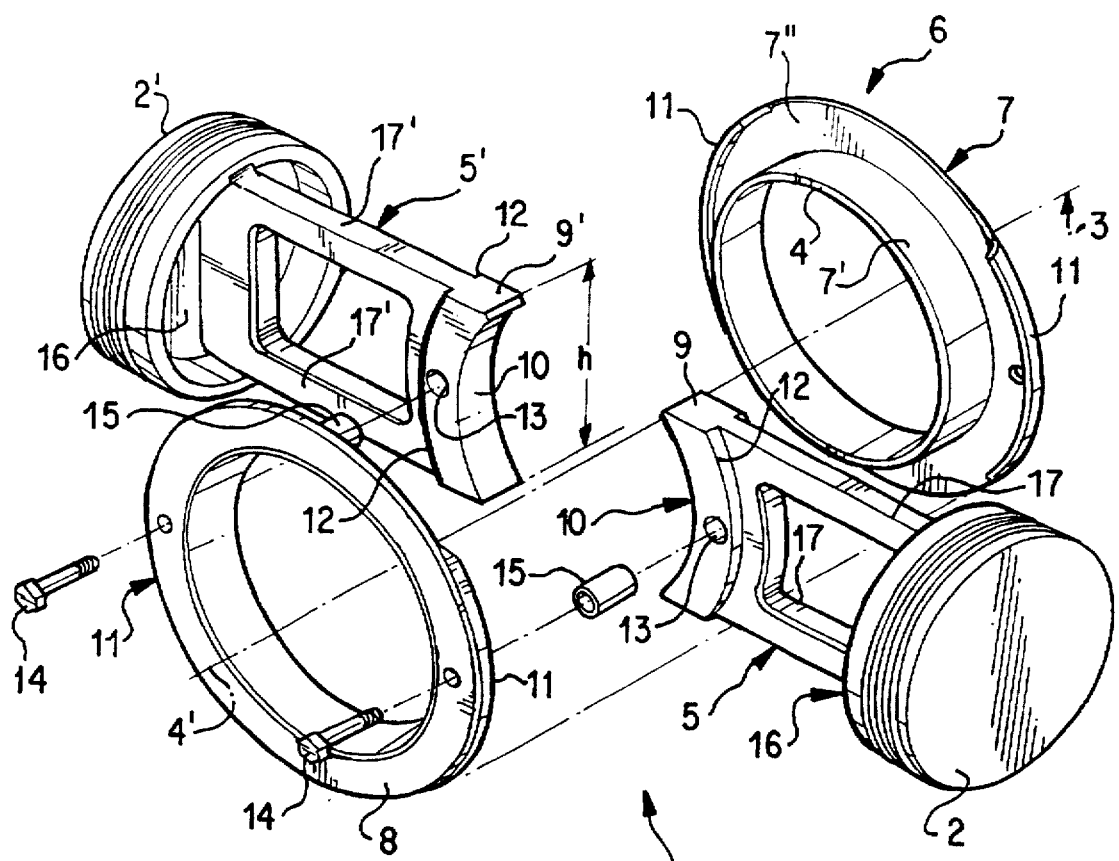
FIG. 2 shows the eccentric rod in FIG. 1 in an exploded view.

As can be seen in FIG. 2, eccentric rod 1 according to the invention is made of three parts. In addition to the two rod sections 5, 5' it comprises a separate central part 6 that contains bearing opening 4. This central part 6 is formed by a collar-type bearing ring 7 and an annular flange 8 centered in the free outer circumferential area of bearing ring 7', with rod sections 5, 5' being connected by pressure-side guide surfaces 10, 10' located in connecting arcs 9, 9' with the outer circumference of bearing ring 7'. In addition, concentrically arranged stops 11 with guide surfaces 12' on the pulling sides located on connecting arcs 9, 9' of rod sections 5, 5' cooperate at collar 7" of collar-type bearing ring 7 as well as on annular flange 8 with respect to axis 4' of bearing opening 4.

In addition, annular flange 8 and collar 7", while preserving the angular mobility of rod sections 5, 5', are connected with one another in such fashion that rod sections 5, 5' or their connecting arcs 9, 9' are supported by threaded bolts 14 in annular flange 8 and collar 2" that pass through openings 13, with bushings 15 made of elastic material being associated with threaded bolts 14 in openings 13 and serving as elastic angle stops.

Figure 4:
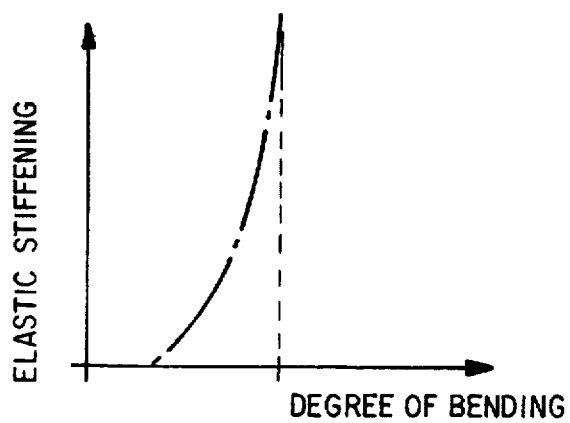
FIG. 4 shows a graph of a curve showing progressive elastic stiffening, plotted against the degree of bending.

These elastic bushings 15 traversed by threaded bolts 14 delimit the angular movements of rod sections 5, 5' by a progressive stiffening that results from the deformation of the bushing, said stiffening according to FIG. 4 serving as a stop at a predetermined bend.

In addition, FIG. 2 in particular shows that each of connecting arcs 9, 9' that has guide surfaces 10, 12 and 10' and 12 is connected integrally with two ribs 17, 17' that join near the outer contour of the respective piston 2, 2' at its underside 16, 16', with each connecting arc 9, 9' having a seam dimension "h" that is small by comparison with the diameter of the respective piston 2, 2'. In this way the installation of a piston 2, 2' with corresponding rod sections 5, 5' in a cylinder from the cylinder head side can be ensured.

Figure 3:
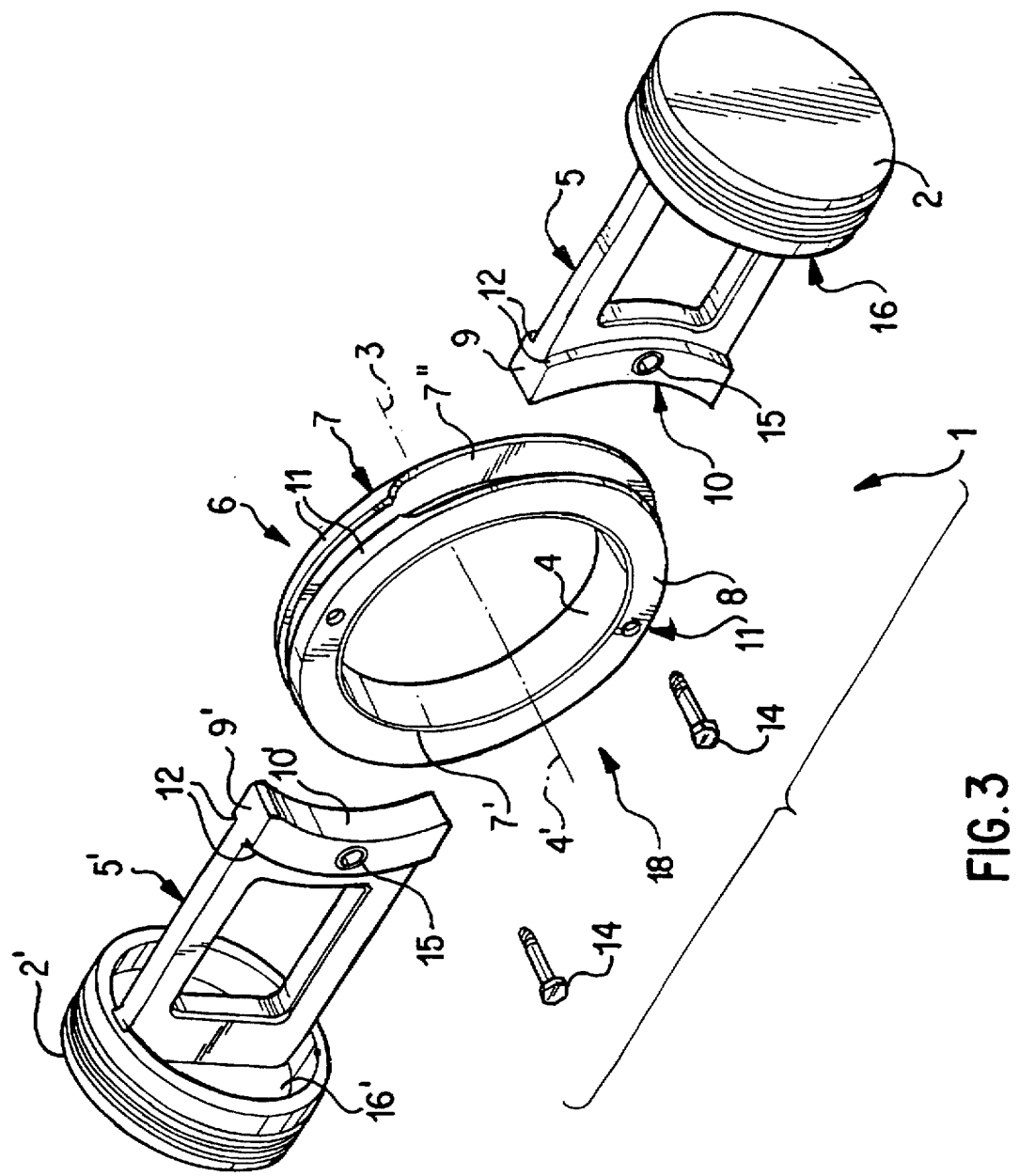
FIG. 3 shows an eccentric rod in an exploded view with a modified central part in the mounting position.

FIG. 3 shows a central part 6 in which collar-type bearing ring 7 and angular flange 8 form a mounting part 18 that is made in one piece or is caused to be in one piece by means of solid connections, with concentric stops 11 extending essentially over the length of the tension-side guide surfaces 12 on connecting arcs 9, 9'. Collar 7" and annular flange 8 are designed to be spaced apart from one another in the circumferential direction between diametrical stops 11 corresponding to the thickness or heaviness of connecting arcs 9, 9'. This design permits a radial guidance of rod cross sections 5, 5' that support pistons 2, 2' relative to annular assembly part 18 until their concentric guide surfaces 10, 10' on the pressure side meet at the outer circumference of bearing ring 7' between collar 7" and annular flange 8. Rotation of mounting part 18 on the stroke eccentric, which is not shown but engages bearing opening 4, by about 90° causes stops 11 on annular flange 8 and collar 7" to overlap the tension-side guide surfaces 12 of rod sections 5, 5'. The bolts 14 which together with elastic bushings 15 in openings 13 act as rotational angle stops also secure central part 6 and/or mounting part 18 in position relative to rod sections 5, 5'.

The multipartite design of eccentric rod 1 according to the invention makes it possible in an advantageous fashion, to make central part 6 from steel in order to achieve a small bearing play in bearing opening 4, while pistons 2, 2' are made of lightweight metal with associated rod sections 5, 5' to reduce weight.

Advantageously, middle part 8 and/or mounting part 18 can be manufactured as a stamped sheet metal part, with guide surfaces being machined by grinding.

The eccentric rods which according to the invention are movable by bending centrally against a progressively increasingly elastic resistance and support pistons at both ends ("Elasto-Kolben"), because of their tolerance compensation in the piston travel direction, can be used advantageously in a reciprocating piston engine proposed in German Patent Application 195 09 155, in which a hypocycloid crank drive drives two pairs of pistons in diametrically opposed cylinders in the same direction through two eccentric rods. For this reciprocating engine, a crank drive is proposed with a straight guide which is single for design reasons and is located between the two eccentric rods, preferably as a Watt suspension link.

Since the latter is known to have a slightly serpentine guide line instead of an ideal straight guide line between its extreme deflections that correspond to the two piston TDC/BDC positions, its variation from the ideal straight guide line is advantageously reduced by the bending eccentric rod as it acts.

Within the scope of the invention, an eccentric rod that is made in one piece and connects both pistons 2, 2' can be provided with elastically flexibly designed sections for bending centrally.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Reciprocating engine with a hypocycloid crank drive, said engine comprising an eccentric rod connected at both ends with pistons in diametrically opposed cylinders, said eccentric rod having a bearing opening in a central part located parallel to a crankshaft rotary axis, for rotary-movable acceptance of a stroke eccentric of the hypocycloid crank drive, said eccentric rod comprising a plurality of rod sections that are movably mounted to the central part at an angle around said bearing opening.

2. Reciprocating engine according to claim 1, wherein the angular movement of said rod section being produced by an elastic arrangement.

3. Reciprocating engine according to claim 2, wherein said elastic arrangement comprises an elastic bushing.

4. Reciprocating engine according to claim 1, wherein said central part is a separate element that defines said bearing opening, said rod sections being connectable in an angularly movable fashion with said separate central part via respective guides that are concentric with respect to the axis of the bearing opening and are located on the tension and compression side, with corresponding devices on the central part, each said rod section being elastically angle-limited by an elastic stop with respect to the central part.

5. Reciprocating engine according to claim 1 wherein said central part is formed by a collar-type bearing ring and an annular flange centered in the free outer circumferential area of the bearing ring, said rod sections being connected by pressure-side guide surfaces with the outer circumference of said bearing ring, and stops arranged concentrically with respect to the axis of the bearing opening cooperate with tension-side guide surfaces of the rod sections on an axially-facing collar portion of the collar-type bearing ring and on the annular flange.

6. Reciprocating engine according to claim 5 wherein said annular flange and said collar portion are connected with one another while preserving the angular mobility of the rod sections, the rod sections being supported by bolts that pass through openings in the rod sections, elastic bushings serving as elastic angle stops in the openings.

7. Reciprocating engine according to claim 6, wherein the bolts are threaded.

8. Reciprocating engine according to claim 5, characterized in that wherein the rod sections have said guide surfaces each associated with a connecting arc, said arc being connected with two ribs connected integrally near the outside contour of an underside of the piston, the connecting arc having a seam dimension that is smaller than the diameter of the respective piston.

9. Reciprocating engine according to claim 8, wherein the collar-type bearing ring and annular flange constitute one of a one-piece mounting part and a mounting part that is made integral by permanent connections, concentric stops essentially extending over the length of tension-side guide surfaces of the connecting arcs, and the axially-facing collar portion and the annular flange being spaced apart from one another in a circumferential direction between the concentric stops corresponding to the thickness of the connecting arcs in the axial direction.

10. Reciprocating engine according to claim 9 wherein at least one of the central part and mounting part is made of steel and wherein the pistons and the rod sections are made of lightweight metal.

11. Reciprocating engine according to claim 9, wherein the mounting part is made as a stamped sheet metal part.

12. Reciprocating engine according to claim 9, wherein the angular movements of the rod sections of the centrally bendable eccentric rod are limited as a function of progressively stiffer elastic bushings that serve as stops.

13. Reciprocating engine according to claim 1 wherein two centrally bendable eccentric rods are used for two piston pairs in diametrically opposed cylinders, said piston pairs being driven in the same direction by the hypocycloid crank drive, the crank drive being equipped with a straight guide device that is adjustable and is located between the eccentric rods.

14. Reciprocating engine according to claim 13 wherein the straight guide device is a Watt linkage.

15. Reciprocating engine according to claim 1, wherein said eccentric rod of the double piston is made in one piece with sections that are designed to be elastically flexible.

16. Method of manufacturing a reciprocating engine with a hypocycloid crank drive, said method comprising:

forming an eccentric rod of rod sections and a central part which defines a central bearing opening, said rod sections being movably mounted to the central part at an angle around the bearing opening;

arranging said eccentric rod with said bearing opening located parallel to a crankshaft rotary axis for rotary-movable acceptance of a stroke eccentric of the hypocycloid crank drive, connecting pistons to both ends of said eccentric rod in diametrically opposed cylinders, arranging elastic elements to define admissible angular movements of the rod sections.

17. Method according to claim 16, wherein in said forming step said central part is formed as a separate element that comprises the bearing opening, and further comprising connecting said rod sections in an angularly movable fashion via guides that are concentric relative to an axis of the bearing opening and are located on the tension and compression side, with corresponding devices located on the central part, and elastically angle-limiting each rod section via an elastic stop relative to the central part.

* * * * *